UNITED STATES PATENT OFFICE.

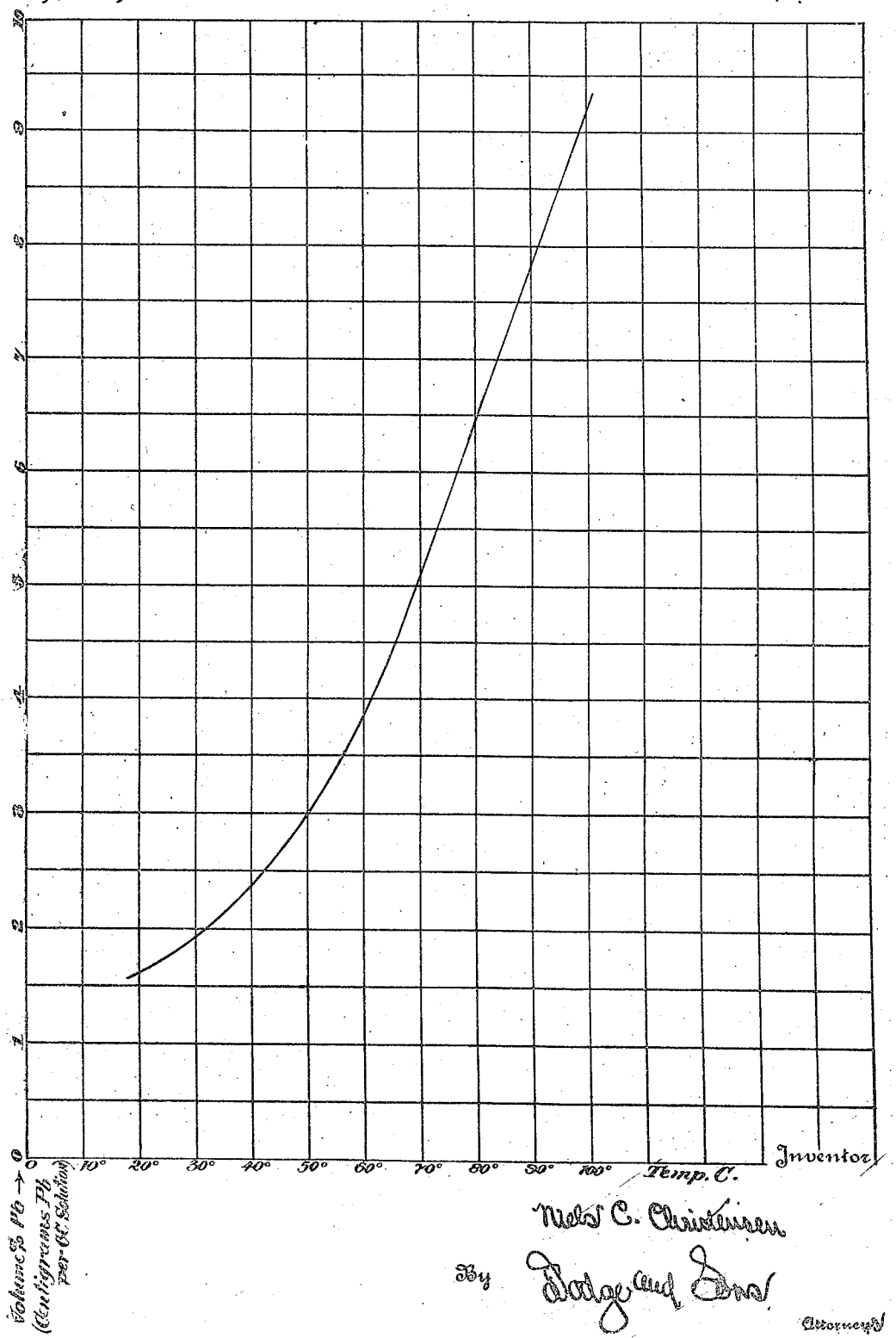

NIELS C. CHRISTENSEN, OF SALT LAKE CITY, UTAH.

PROCESS OF TREATING LEAD-CARBONATE ORES.

1,390,603.　　　　Specification of Letters Patent.　Patented Sept. 13, 1921.

Application filed September 30, 1919. Serial No. 327,403.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Lead-Carbonate Ores, of which the following is a specification.

This invention relates to the treatment of carbonate ores of lead for the recovery of the lead therefrom. My process is applicable to all carbonate ores which do not contain too much soluble material such as limestone. The process is hydrometallurgical but the product may be treated by pyrometallurgical methods if desired.

My process consists in treating the comminuted ore with a concentrated sodium chlorid solution containing iron salts in solution. Either the sulfate or chlorid may be used and either ferrous or ferric salts. I have found that a strong salt solution containing iron salts acts on the carbonate of lead and brings it into solution and precipitates the iron in the form of the hydroxid as indicated below:

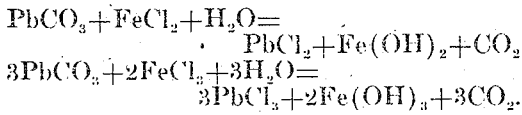

The cold solution acts slowly and holds but a comparatively small percentage of lead. The hot solution acts very rapidly and holds a comparatively large amount of lead in solution. Only a very slight excess of iron salts over that theoretically required to act on the lead carbonate is necessary, in the hot solution practically no excess being necessary. A large excess of iron salts should be avoided as the amount of lead chlorid which the solution will hold is reduced by the iron salts present. Sulfates also reduce the solubility of the lead chlorid.

In the accompanying drawing is shown a diagram illustrative of the solubility of the lead chlorid at varying temperatures.

The curve on the diagram shows the solubility of lead chlorid in a practically saturated salt solution containing a small amount of sulfate at different temperatures. The term "volume per cent." is the per cent. of lead in solution, figuring the density of the solution as 1, *i. e.* it is the weight of lead in centigrams held in one cubic centimeter of the solution. This curve shows the great difference in the amount of lead chlorid held in the saturated solution when hot and when cold.

In my preferred method of precipitating the lead chlorid I take advantage of this large difference in the amount of lead held in the saturated solution hot and cold to recover the lead from the solution, by treating the ore with just enough of the hot solution to secure a concentrated lead solution, separating this hot lead solution from the ore and cooling it and separating the precipitated lead chlorid from the cold solution.

My preferred method of precipitating the metallic lead from the chlorid is an important step in the process as by it I regenerate the iron salts necessary in the process. This precipitation is secured by electrolyzing the solution containing the lead with iron anodes or by treating the precipitated lead chlorid with metallic iron. In either case ferrous chlorid is formed and is used in dissolving more lead carbonate as indicated below:

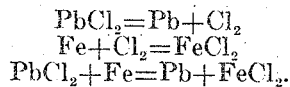

The electrolysis of the lead solution is very simple, the lead being precipitated in the form of a sponge and the ferrous chlorid being formed at the anode.

Cold solutions give good results but with warm or hot solutions a lower voltage and higher current density may be used. The voltage used may be reduced to less than .3 in a hot solution and current densities as high as 100 amperes per square foot may be used with the concentrated lead solutions.

Metallic iron does not precipitate the lead from the concentrated salt solution very readily so in case the lead chlorid is reduced by direct treatment with iron the lead chlorid precipitated by cooling the hot solution is treated with the iron. This is done by mixing the chlorid with water and bringing into contact with the iron, enough water being used so that the ferrous chlorid solution does not become too concentrated.

The lead may also be precipitated from the salt solution by the addition of lime but this method does not lend itself to the regeneration of the iron salts.

From the foregoing it is readily seen that my complete process consists in treating the ore with a concentrated salt solution containing iron salts in solution and separating the pregnant salt solution from the ore and precipitating the lead solution from the solution or chlorid with the aid of iron either by electrolysis or by direct chemical action so as to generate the iron salts necessary for the treatment of more ore.

The exact method of treatment may be varied considerably. I prefer to agitate the ore with a hot salt solution in such proportion to secure a concentrated lead solution and separate the hot pregnant solution from the ore, and precipitate most of the lead as a chlorid by cooling and the remaining portion by electrolysis with iron anode. The precipitated lead chlorid is then electrolyzed with iron anodes in a separate salt solution or treated with iron in the presence of water to give metallic lead and ferrous chlorid. It may also be heated with iron to give lead and ferrous chlorid. The ferrous chlorid thus formed is returned to the mill solution and used to dissolve the lead from more ore. All the lead may be precipitated from the warm solution by electrolysis with an iron anode, or colder solutions may be used and all the lead be precipitated therefrom by electrolysis with an iron anode.

From the foregoing it will be apparent that a great many slight variations may be introduced in the practical application of the process, and I therefore do not desire to be limited by the foregoing brief descriptions but by the appended claims.

With my process it is possible to secure a practically complete extraction of the lead in oxidized lead ores. The main loss of chemicals in the process is the salt in the tailings and a small amount of iron salts. The iron required is a little over $\frac{1}{4}$ of a pound per pound of lead.

Having described my process, what I claim and desire to patent is:

1. The process of treating carbonate ores of lead which consists in treating said ores with a concentrated solution of sodium chlorid containing iron salt in solution and thereby dissolving the lead.

2. The process of treating carbonate ores of lead which consists in treating said ores with a hot concentrated solution of sodium chlorid containing iron salt in solution and thereby dissolving the lead.

3. The process of treating carbonate ores of lead which consists in treating said ores with a concentrated solution of sodium chlorid containing iron salt in solution and thereby dissolving the lead, and separating said solution from the ore and precipitating lead therefrom by the aid of metallic iron so as to form iron salts, and using said iron salts for the treatment of more ore.

4. The process of treating carbonate ores of lead which consists in treating said ores with a hot concentrated solution of sodium chlorid containing iron salt in solution and thereby dissolving the lead, and separating said hot solution from the ore and cooling it and thereby precipitating lead chlorid therefrom.

5. The process of treating carbonate ores of lead which consists in treating said ores with a hot concentrated solution of sodium chlorid containing iron salt in solution and thereby dissolving the lead, and separating said hot solution from the ore and cooling it and thereby precipitating lead chlorid therefrom, and precipitating metallic lead from said lead chlorid and said cold solution by the aid of metallic iron so as to form iron salts and using said iron salts in the treatment of more ore.

6. The process of treating carbonate ores of lead which consists in treating said ores with a concentrated solution of sodium chlorid containing iron salt in solution and thereby dissolving the lead, and separating said solution from the ore, and precipitating the lead therefrom by electrolysis with iron anodes, and using the iron salts thus formed for the treatment of more ore.

7. The process of treating carbonate ores of lead which consists in treating said ores with a hot concentrated soluton of sodium chlorid containing iron salt in solution and thereby dissolving the lead, and separating said hot solution containing the lead from the ore and precipitating the lead therefrom by electrolysis with an iron anode and using the iron salts thus formed for the treatment of more ore.

8. The process of treating carbonate ores of lead which consists in treating said ores with a hot concentrated solution of sodium chlorid containing iron salt in solution and thereby dissolving the lead, and separating said hot solution from the ore and cooling the solution and thereby precipitating the lead chlorid, recovering the lead from the precipitated chlorid and from the cooled solution by electrolysis with an iron anode, and using the iron salts thus formed for the treatment of more ore.

9. The process of making lead chlorid from carbonate ores of lead which consists in treating said ores with a hot concentrated solution of sodium chlorid containing iron salts and thereby dissolving the lead in said solution, separating said hot solution containing lead from the ore and cooling said solution and thereby precipitating lead chlorid therefrom.

In testimony whereof I have signed my name to this specification.

NIELS C. CHRISTENSEN.